(12) United States Patent
Nishio (10) Patent No.: US 6,654,863 B2
(45) Date of Patent: Nov. 25, 2003

(54) DISC REPRODUCTION APPARATUS AND METHOD THEREFOR

(75) Inventor: Yoshimichi Nishio, Kawagoe (JP)

(73) Assignee: Pioneer Corporation, Tokyo (JP)

( * ) Notice: Subject to any disclaimer, the term of this patent is extended or adjusted under 35 U.S.C. 154(b) by 208 days.

(21) Appl. No.: 09/789,930

(22) Filed: Feb. 22, 2001

(65) Prior Publication Data

US 2001/0027509 A1 Oct. 4, 2001

(30) Foreign Application Priority Data

Feb. 23, 2000 (JP) .................................. 2000-045979

(51) Int. Cl.[7] .............................................. G06F 12/08
(52) U.S. Cl. ........................ 711/162; 711/113; 711/112; 711/137
(58) Field of Search ................................ 711/162, 113, 711/137, 112

(56) References Cited

U.S. PATENT DOCUMENTS

| | | | | |
|---|---|---|---|---|
| 5,210,845 A | * | 5/1993 | Crawford et al. | 711/128 |
| 5,345,576 A | * | 9/1994 | Lee et al. | 711/122 |
| 5,708,803 A | * | 1/1998 | Ishimi et al. | 712/233 |
| 6,012,135 A | * | 1/2000 | Leedom et al. | 711/208 |
| 6,131,141 A | * | 10/2000 | Ravid | 711/112 |

FOREIGN PATENT DOCUMENTS

| | | |
|---|---|---|
| JP | 9-82035 | 3/1997 |
| JP | 10-116468 | 5/1998 |
| JP | 10-247356 | 9/1998 |
| JP | 2001-6255 B1 | 1/2001 |

\* cited by examiner

*Primary Examiner*—Kevin L. Ellis
*Assistant Examiner*—Midys Inoa
(74) *Attorney, Agent, or Firm*—Sughrue Mion, PLLC (57) ABSTRACT

A reproduction apparatus is provided for use with a recording medium on which sub-data is recorded in association with main data. The apparatus includes a reading device for reading the sub-data from the recording medium, a memory for storing the sub-data, a data discriminator for determining whether a piece of sub-data read from the recording medium, which is at least one portion of the sub-data, is included in stored data already stored in the memory, and a controller. The controller stops the reading device from reading the sub-data when the data discriminator determines that the piece of sub-data is included in the stored data.

14 Claims, 7 Drawing Sheets

FIG. 1

| FRAME | | | | | | | | |
|---|---|---|---|---|---|---|---|---|
| 1 | | | | S0 | | | | |
| 2 | | | | S1 | | | | |
| · | P1 | Q1 | R1 | S1 | T1 | U1 | V1 | W1 |
| · | P2 | Q2 | R2 | S2 | T2 | U2 | V2 | W2 |
| · | · | · | · | · | · | · | · | · |
| · | · | · | · | · | · | · | · | · |
| 97 | P95 | Q95 | R95 | S95 | T95 | U95 | V95 | W95 |
| 98 | P95 | Q96 | R96 | S96 | T96 | U96 | V96 | W96 |
| FRAME 1 | | | | S0 | | | | |
| 2 | | | | S1 | | | | |
| · | P1 | Q1 | R1 | S1 | T1 | U1 | V1 | W1 |
| · | P2 | Q2 | R2 | S2 | T2 | U2 | V2 | W2 |
| · | | | | · | | | | |
| · | | | | · | | | | |

FIG. 3

| BLOCK NO. | POINT | PMIN | PSEC | PFRAME | |
|---|---|---|---|---|---|
| n | 00 | 00 | 02 | 30 | ⎫ ABSOLUTE TIME AT WHICH A FIRST MELODY STARTS |
| n+1 | 00 | 00 | 02 | 30 | |
| n+1 | 00 | 00 | 02 | 30 | ⎭ |
| n+3 | 02 | 15 | 40 | 65 | ⎫ ABSOLUTE TIME AT WHICH A SECOND MELODY STARTS |
| n+4 | 02 | 15 | 40 | 65 | |
| n+5 | 02 | 15 | 40 | 65 | ⎭ |
| n+6 | 03 | 35 | 08 | 25 | ⎫ ABSOLUTE TIME AT WHICH A THIRD MELODY STARTS |
| n+7 | 03 | 35 | 08 | 25 | |
| n+8 | 03 | 35 | 08 | 25 | ⎭ |
| n+9 | A0 | 01 | 00 | 00 | ⎫ FIRST MOVEMENT NO. |
| n+10 | A0 | 01 | 00 | 00 | |
| n+11 | A0 | 01 | 00 | 00 | ⎭ |
| n+12 | A1 | 03 | 00 | 00 | ⎫ LAST MOVEMENT NO. (i.e., TOTAL NUMBER OF MELODIES) |
| n+13 | A1 | 03 | 00 | 00 | |
| n+14 | A1 | 03 | 00 | 00 | ⎭ |
| n+15 | A2 | 48 | 20 | 05 | ⎫ ABSOLUTE TIME AT WHICH READ-OUT STARTS (i.e., TOTAL PLAYING TIME) |
| n+16 | A2 | 48 | 20 | 05 | |
| n+17 | A2 | 48 | 20 | 05 | ⎭ |
| n+18 | 01 | 00 | 02 | 30 | ⎫ TO BE REPEATED BELOW → |
| n+19 | 01 | 00 | 02 | 30 | |
| n+20 | 01 | 00 | 02 | 30 | |
| n+21 | 02 | 15 | 40 | 65 | |

|   | 0 | 1 | 2 | 3 | 4 | 5 |
|---|---|---|---|---|---|---|
| 0 |   |   |   |   |   |   |
| 1 |   |   |   |   |   |   |
| 2 |   |   |   |   |   |   |
| 3 |   |   |   |   |   |   |
| 4 |   |   |   |   |   |   |
| 5 |   |   |   |   |   |   |
| 6 |   |   |   |   |   |   |
| 7 |   |   |   |   |   |   |
| 8 |   |   |   |   |   |   |
| 9 |   |   |   |   |   |   |
| 10 |   |   |   |   |   |   |
| 11 |   |   |   |   |   |   |

DISC REPRODUCTION APPARATUS AND METHOD THEREFOR

BACKGROUND OF THE INVENTION

1. Field of the Invention

The present invention relates to a reproduction apparatus and a method for use with a recording medium, and more particularly to a reproduction apparatus and a method for use with a recording medium on which sub-data is recorded in association with main data such as audio and/or visual data.

2. Description of the Related Art

Currently, compact discs (CDs) and digital versatile discs (DVDs) have become widespread as digital video and audio media. Technological development has been made to improve capability and performance of the media for a next-generation packaged medium.

Sub-data is recorded in association with main data such as audio or visual data on the DVD or the CD-text disc in addition to control data related to the contents of the discs.

More particularly, the CD-text disc has the control data (i.e., Q channel data) and the sub-data (i.e., text data) recorded in the sub-code region of a TOC (Table of Contents) region in addition to the main data (i.e., audio data). Thus, it is necessary to read the control data and the text data to reproduce the CD-text disc. It takes a few seconds to read the control data of the CD-text disc and the maximum amount of the text data of 2048 packs (in a case of MODE4). Therefore, a user of a reproduction apparatus had to wait a long time for appearance of the text data on a display device. Moreover, it is impossible to start reading the main data such as music data until the control data and the text data is completely read or loaded. Thus, this causes a problem of requiring a long time for the completion of set-up until the main data is reproduced.

Furthermore, take as an example a disc-changer reproduction apparatus having a plurality of recording media loaded thereon and reproducing the media sequentially while replacing the media one after another. In this case, it was necessary for the apparatus to read the control data or the text data every time the recording medium is replaced. This made it difficult to improve various functions and performances such as a displaying speed of the text data as well as display control or reproduction control during the replacement of the recording media.

In addition, it takes time to read and decode compressed data when the sub-data such as audio data or sub-picture data is read before the main data or video data is reproduced in a case of the DVD video discs. This made it difficult to improve various functions and performances of reproduction apparatuses.

OBJECT AND SUMMARY OF THE INVENTION

The present invention has been developed in view of the above-mentioned problems. An object of the present invention is to provide a method and a reproduction apparatus which can realize high-speed reproduction control of a recording medium and improved function and performance.

To achieve the object, according to the present invention, there is provided a reproduction apparatus for use with a recording medium on which sub-data is recorded in association with main data, which comprises a reading device for reading the sub-data from the recording medium, a memory for storing the sub-data, a data discriminator for determining whether a piece of sub-data read from the recording medium, which is at least one portion of the sub-data, is included in stored data already stored in the memory, and a controller for stopping the reading device from reading the sub-data when the data discriminator determines that the piece of sub-data is included in the stored data.

According to another aspect of the present invention, the controller controls so as to perform reproduction of the recording medium in accordance with the stored data when the data discriminator determines that the piece of sub-data is included in the stored data.

According to the present invention, there is provided a method of reproducing a recording medium on which sub-data is recorded in association with main data, which comprises the steps of reading the sub-data from the recording medium, storing the sub-data, determining whether a piece of sub-data read from the recording medium, which is at least one portion of the sub-data, is included in the stored data, and stopping reading the sub-data when the piece of sub-data is included in the stored data.

According to another aspect of the present invention, reproduction of the recording medium is performed in accordance with the stored data when the piece of sub-data is included in the stored data.

BRIEF DESCRIPTION OF THE DRAWINGS

These and other objects and advantages of the present invention will become clear from the following description with reference to the accompanying drawings, wherein.

DETAILED DESCRIPTION OF THE PREFERRED EMBODIMENTS

The embodiments of the present invention will be described in detail below with reference to the accompanying drawings. The CD-text disc will be described below as an example of a recording medium on which a recorded information reproduction apparatus according to the present invention performs reproduction.

Figure 1:
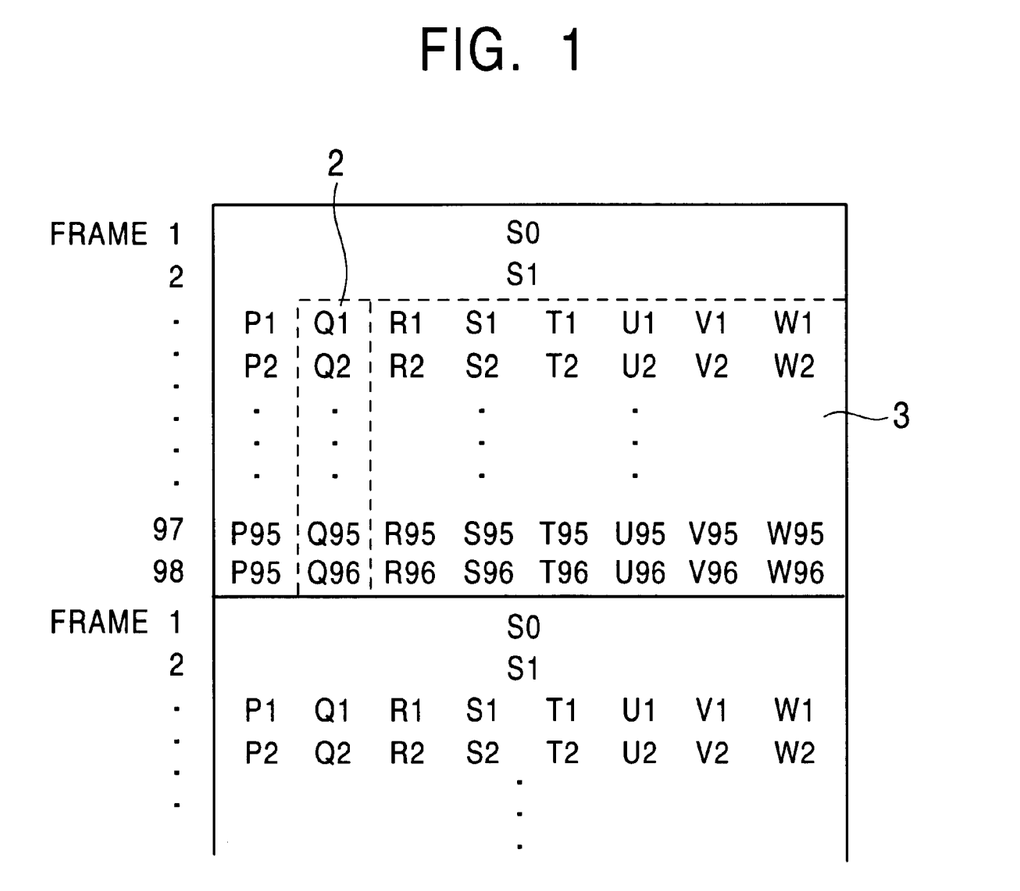
FIG. 1 is a view illustrating the sub-code data structure of a CD-text disc.

FIG. 1 illustrates the data structure of sub-codes of the CD-text disc. The sub-code is stored as a part of TOC data recorded on a program control region and has 8-bit data in each frame. Each bit of the 8-bit data is referred to as P, Q, R, S, T, U, V, and W bit. Data recorded on the CD has 98 frames which constitute one block (a sub-coding frame). The sub-coding in a block includes two synchronous patterns (S0, S1) at the head and 96×8 bit data composed of P to W channels.

Figure 2:
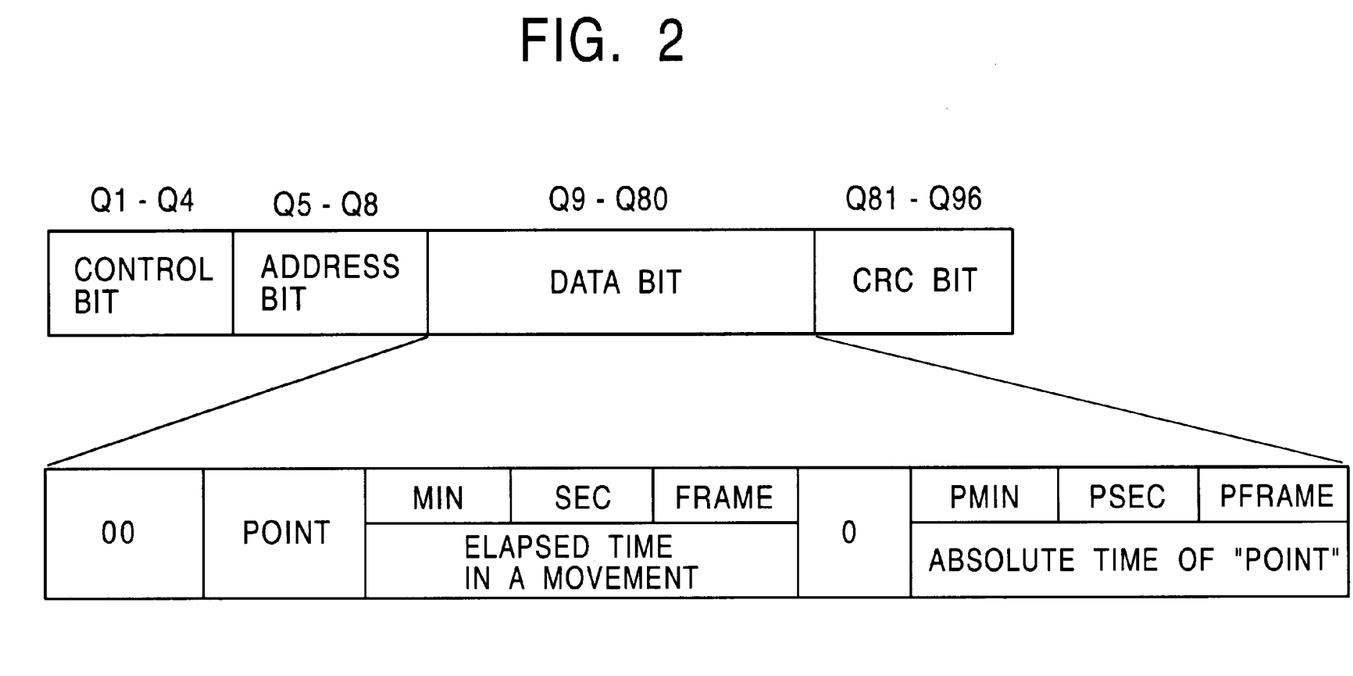
FIG. 2 is a view illustrating the data structure of Q channels (Q1 to Q96) in a read-in area.

FIG. 2 illustrates the data structure of Q channels (Q1 to Q96) 2 of each block. The Q channel 2 is composed of a control bit region, an address bit region, a data bit region, and a CRC (Cyclic Redundancy Code) bit region. In more detail, the control bit region includes data indicating the type of discs (i.e., data indicating a ROM disc or an audio disc, presence or absence of pre-emphasis, 2 or 4 channels, etc.). The address bit region specifies the contents of data in the Q channel. For example, the region is provided with the contents of the audio program when the data is "0001" as shown in FIG. 2.

In the data bit region, recorded thereon are the start time of the main data or audio programs (i.e., tunes or melodies), the total number of the programs, and the recorded position of each program. More specifically, the "track number" designates the movement number of the program (a melody number), while the "elapsed time in a movement" designates the time elapsed from the start of the melody. For example, the "point" and the contents of the "point" can be specified as follows.

(1) When the "point"="00" to "99", indicated is
   the time at which the melody designated by the number is started.
(2) When the "point"="A0",
   "pmin"=the first movement number, and "psec"= "pframe"="00".
(3) When the "point"="A1",
   "pmin"=the last movement number, and "psec"= "pframe"="00".
(4) When the "point"="A2", indicated is
   the absolute time at which read-out is started.

Figure 3:
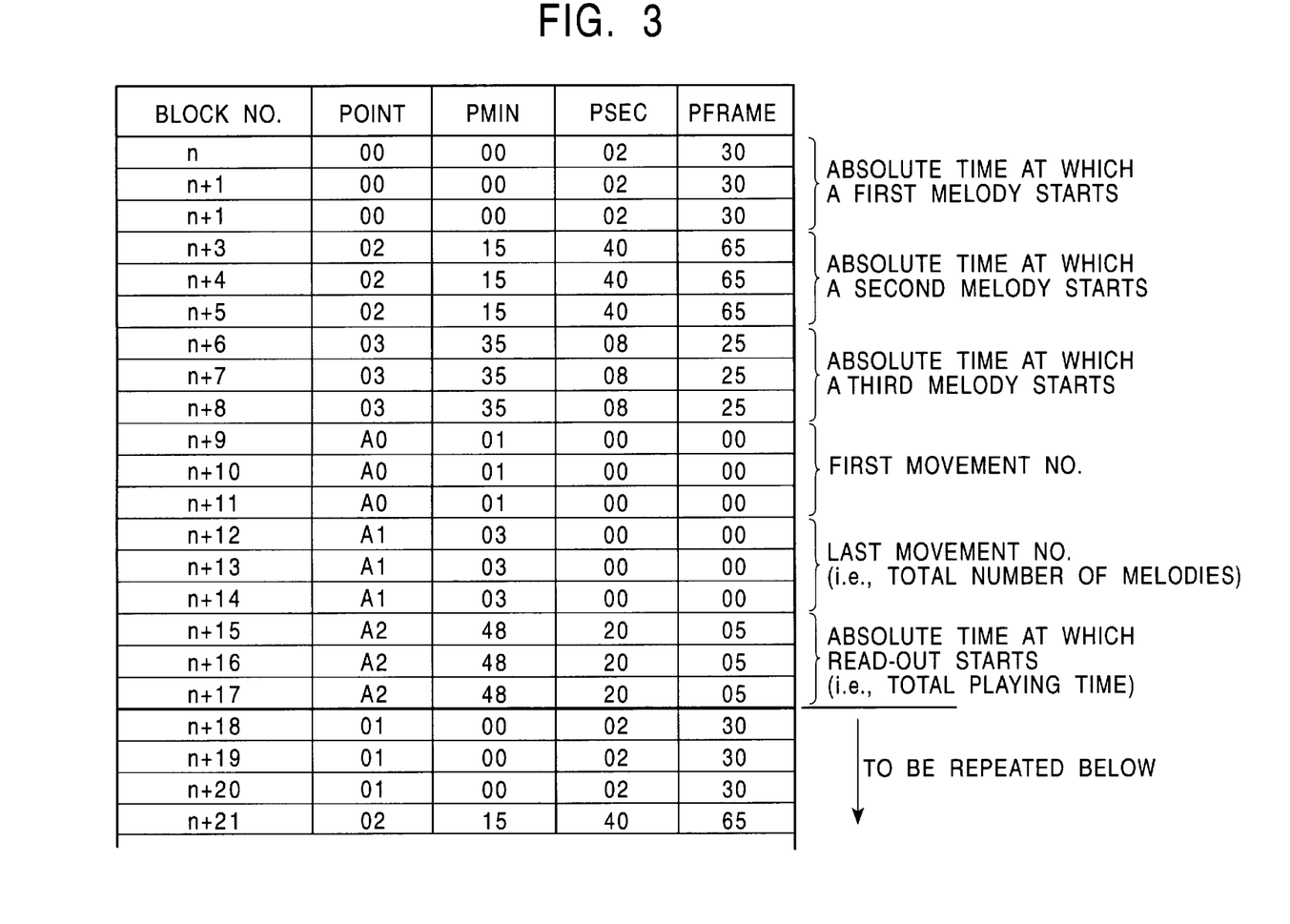
FIG. 3 illustrates recorded contents in a data bit area, showing a disc with three music numbers or melodies recorded thereon as an example.

FIG. 3 illustrates the contents of the data bit region recorded on a disc, for example, having three melodies recorded thereon. The "point" and the contents of the corresponding "point" are each repeated three times to be recorded on the TOC.

Figure 4:
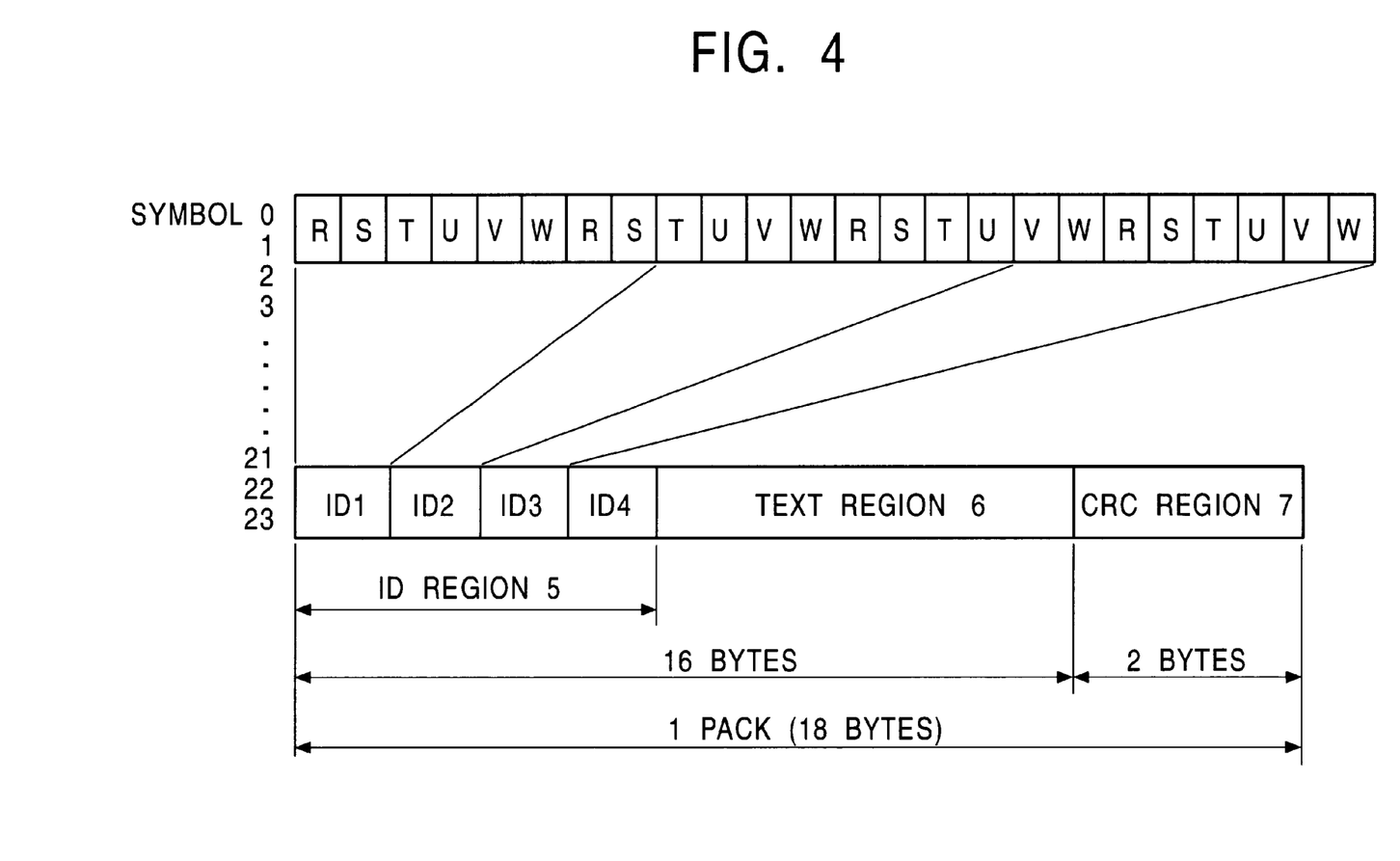
FIG. 4 is a view illustrating, as serial data, the structure of one of the packs in the R–W channels shown in FIG. 1.

FIG. 4 illustrates a pack (=24 symbols) of the R–W channels 3 shown in FIG. 11, showing the data structure thereof as serial data. More particularly, the R–W channels 3 of the 96 frames shown in FIG. 1 include 96 symbols each of which has 6 bits. The 96 symbols are divided into equal parts of 24 symbols which are referred to as a pack, and four packs are referred to as a packet.

As shown in FIG. 4, there is arranged an ID region 5 at the head of each pack of the R–W channels 3. The ID region includes mode information for setting the recording mode of the data to be recorded on the pack. The ID region 5 also includes ID codes of a total of 32 bits including ID1 having identifying information indicating the type of text data, and ID codes (ID2, ID3, and ID4) having other identifying data (in a case of MODE 4). Following the ID region 5, a text region 6 is arranged on which is the text data or the sub-data accompanying the main data. recorded in eight bits Furthermore, arranged is a CRC region 7 on which is recorded an error correction code of 16 bits for detecting errors with a cyclic redundancy code (CRC).

The maximum amount of the text data of the CD-text disc in the MODE 4 is 2048 packs, which cannot be read simultaneously in conjunction with the audio data. Thus, it takes several seconds (for example, a maximum of about 7 seconds) for standard-speed CD players to read the TOC data.

Figure 5:
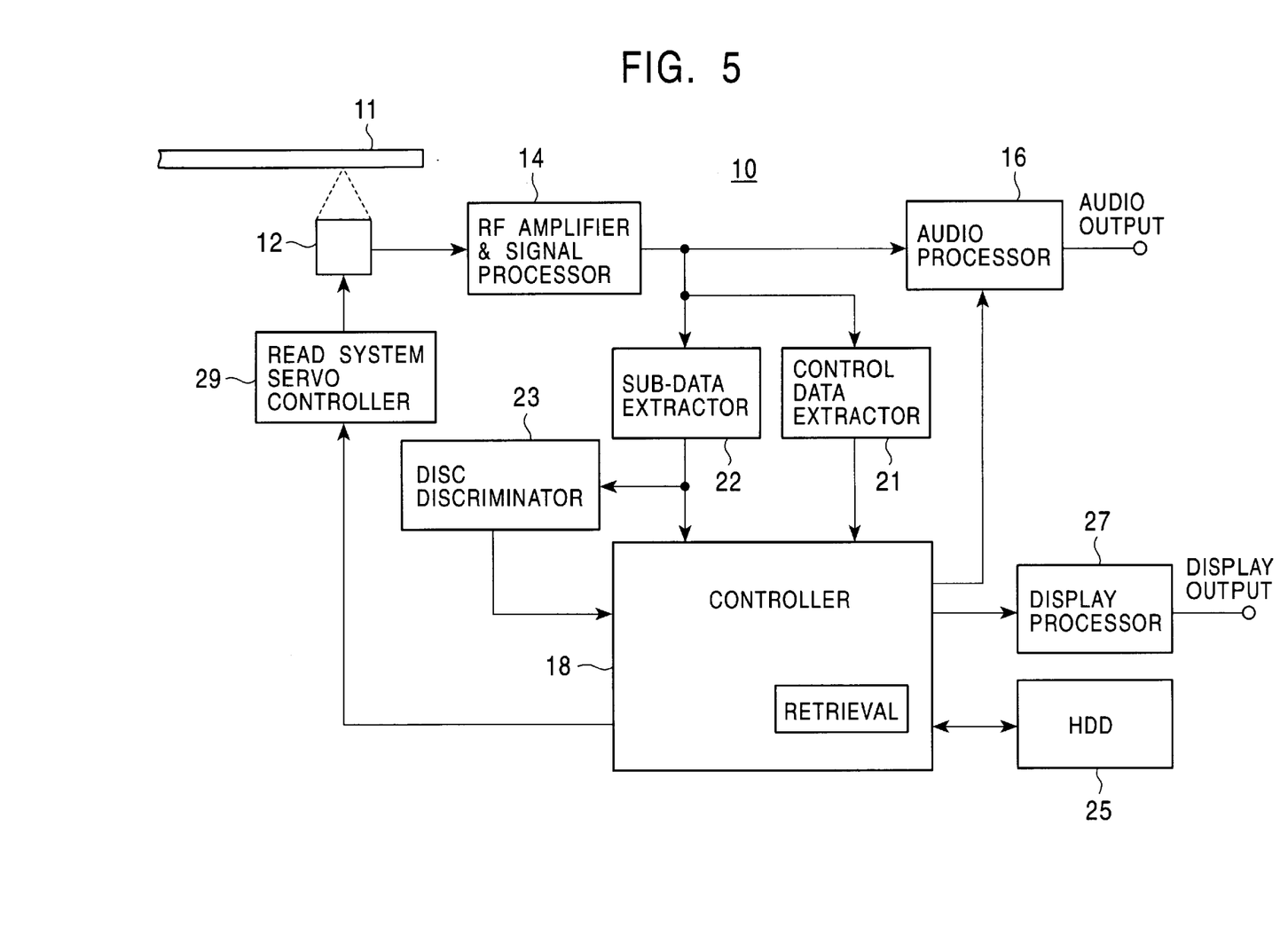
FIG. 5 is a schematic view illustrating the configuration of a CD reproduction apparatus according to a first embodiment of the present invention.

FIG. 5 illustrates schematically the configuration of a CD reproduction apparatus 10 according to a first embodiment of the present invention.

A CD 11 loaded on the CD reproduction apparatus 10 is rotationally driven by a spindle motor (not shown) to read recorded contents by means of an optical pickup 12. A signal from the optical pickup 12 is amplified and decoded in an RF amplifier & signal processor 14. The decoded signal is supplied to an audio processor 16 including a D/A converter (not shown), and is then converted to an analog audio signal for output under the control of a controller 18.

In addition, the decoded signal from the RF amplifier & signal processor 14 is also supplied to a control data extractor 21 and a sub-data extractor 22. Signals of the P, Q channels 2 are extracted in the control data extractor 21 and then supplied to the controller 18. Moreover, the text data of the R–W channels 3 are extracted in the sub-data extractor 22 and then supplied to the controller 18.

A disc discriminator 23 determines if the CD 11 includes the text data (i.e., whether the CD 11 is an CD-text disc or not) in accordance with the sub-code data supplied from the sub-data extractor 22, and then supplies the disc discrimination signal to the controller 18.

The controller 18 serves to control each portion of the CD reproduction apparatus 10. The controller 18 has an internal retrieval part or function for searching and retrieving the data stored in a memory such as a hard disc 25 using at least a portion of the text data. More particularly, the controller 18 has a part to serve as a data discriminator for determining whether a piece of read sub-data is included in the stored data already or previously stored in the hard disc 25. In the hard disc 25, stored is the text data of the discs previously read or the corresponding control data associated therewith in addition to the text data. The controller 18 controls reading and writing of data in the hard disc 25. The controller 18 supplies the text data from the sub-data extractor 22 or the text data read from the hard disc 25 to a display processor 27 for display of the data on a display device (not shown).

The controller 18 is connected to a read system servo controller 29 to perform spindle control of a recording-medium rotational system, control on the optical pickup 12 and so forth.

Figure 6:
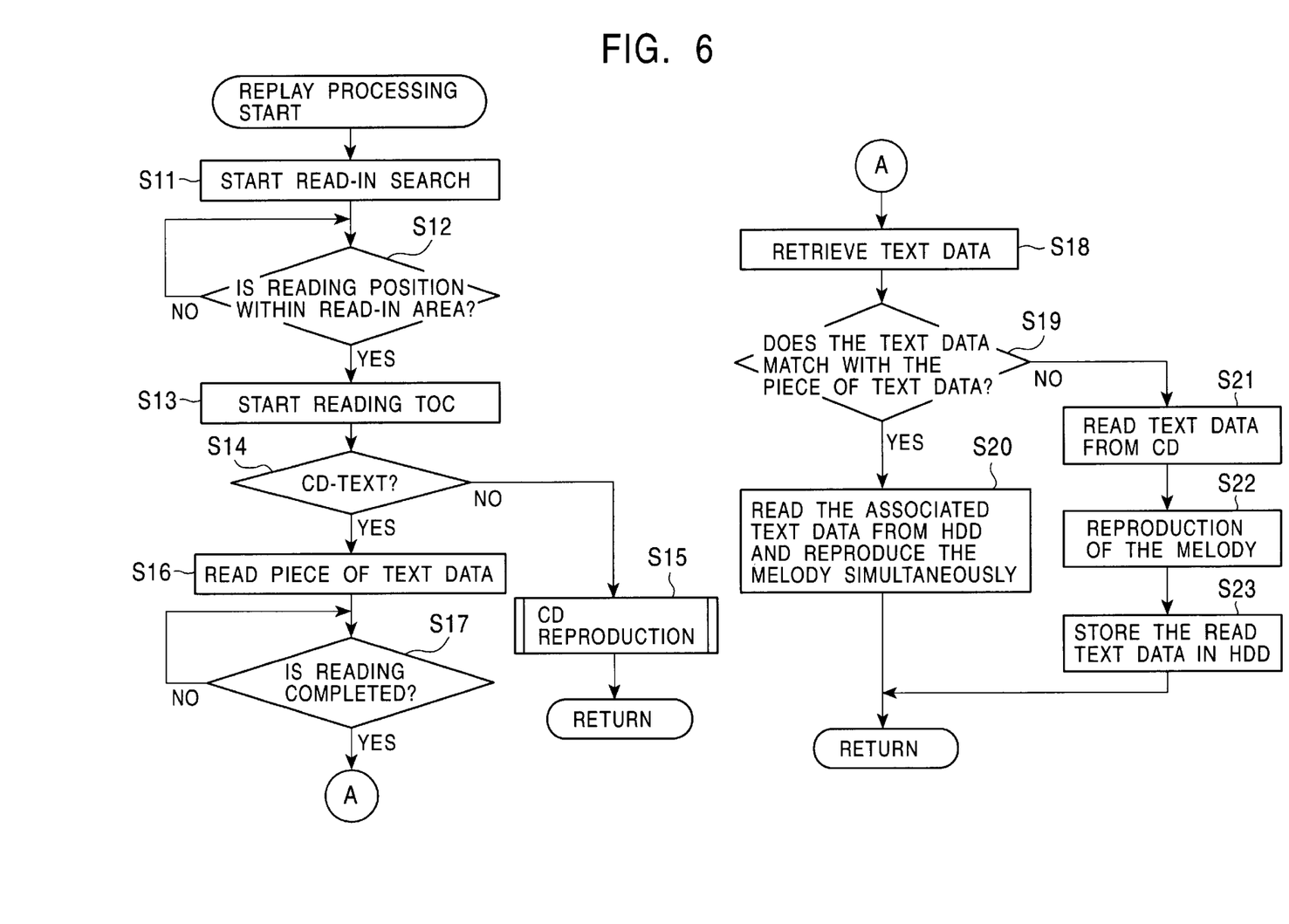
FIG. 6 shows a flow chart illustrating a reproduction processing routine of a reproduction apparatus according to an embodiment of the present invention.

The operation of the CD reproduction apparatus 10 according to an embodiment of the present invention will be explained with reference to the flowchart of FIG. 6. FIG. 6 illustrates the reproduction routine to be executed by the controller 18.

Searching the read-in area of the disc is started (step S11). It is determined if a reading position lies within the read-in area (step S12). If the read-in position lies within the read-in area, reading the TOC is started from the position (step S13).

Then, it is determined if text information or data is recorded on the loaded CD 11 in accordance with the TOC data that has been read (step S14). When it is determined that the CD 11 has no text data recorded thereon (i.e., the CD 11 is not a CD-text disc), control moves on to a sub-routine for reproducing ordinary CD discs (step S15).

If the CD 11 is the CD-text disc, a part of the text data (hereinafter referred to as "a piece of text data"), for example, a predetermined head bits of the text data is read (step S16). It is determined if the reading operation has been completed (step S17). When the piece of text data has been completely read, the data already stored in the hard disc 25 is retrieved (step S18) to determine if any text data matches with the piece of text data (step S19). Incidentally, the sub-code data is simultaneously read from the disc even while the retrieval is being executed.

When it is determined that the text data which matches with the piece of text data has been already stored in the hard disc 25, the corresponding text data is read from the hard disc 25. At this time, suppose that control data has been stored in association with the text data. In this case, control proceeds to display of the text data on a display device and reproduction of the first melody of the audio data based on the text data and the control data that have been read out immediately after the stored text data and the control data have been completely read out. On the other hand, when no control data has been stored, control proceeds to display of the text data on the display device and reproduction of the first melody of the audio data immediately after the stored text data has been completely read out, if the control data has been completely read from the disc. If the control data has not yet been read completely from the disc, control proceeds to display and reproduction immediately after the control data has been completely read (step S20).

When it has been determined in step S19 that no text data matches with the piece of text data, the text data and control data are read from the disc (step S21). Then, control proceeds to display of the text data and reproduction of the audio data (step S22). After or at the same time as control has proceeded to the reproduction, the text data that has been read is stored in the hard disc 25 (step S23). Incidentally, at this time, the control data may be associated with the text data and then stored in the hard disc 25. Thus, the reproduction is carried out according to the steps described above.

Incidentally, in the aforementioned embodiment, the length of text data bits used for retrieval is enough if the length allows for determining the disc. In addition, the position of the piece of text data is not limited to the head of the text data. For example, the position may be a starting position of reading of text data given after the tracking has been closed, i.e., the position of text data which is allowed to be read most quickly from the disc. In addition, the piece of text data needs not to be a continuous part of the text data but may be composed of data selected from a plurality of predetermined positions of the text data.

Figure 7:
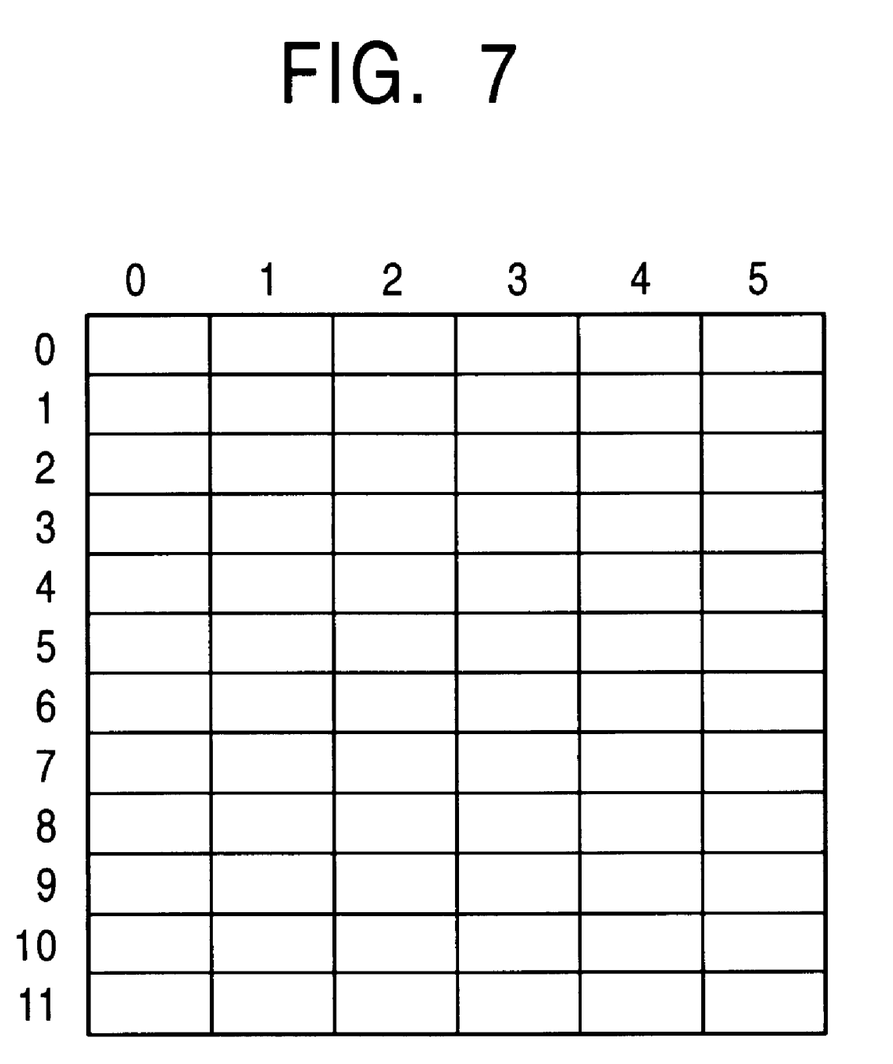
FIG. 7 is a view illustrating an example of characters formed by line graphics according to another example of the sub-data.

Furthermore, the text data is not necessarily characters composed of coded data. For example, an example of characters formed by line graphics is shown in FIG. 7. In general, the R to W bits can be used to implement line graphics display. FIG. 7 shows an example of line graphics display in which a character is expressed with vertical 12 dots and horizontal 6 dots and color display can be implemented in eight colors. Furthermore, the data may be one for a still image implemented by a television graphic display or the like.

The present invention retrieves and determines the discs that have been previously loaded (that is, the text data thereof has been stored) using a part of the text data, thereby making it possible to determine or identify the discs at high speed. Therefore, this makes it possible to implement a reproduction apparatus which can display the text data quickly and reduce the set-up time significantly for starting the reproduction of audio data.

Various embodiments are possible other than the aforementioned first embodiment.

As an embodiment, the present invention can also be applied to a so-called disc changer reproduction apparatus to which a plurality of discs are loaded to reproduce the discs in sequence. More particularly, suppose that the text data of a disc of the plurality of loaded discs has not yet been stored thereon. In this case, the text data of the disc is read beforehand and then stored, thereby implementing various functions for displaying the text data when reproducing the disc. For example, even during replacement of discs, it is possible to display the text data of a desired one of the plurality of discs, or the text data associated with a program or a disc to be subsequently reproduced. In other words, according to the present invention, the text data is stored from the disc in advance of reproduction. A part of the stored text data is used as search data. Therefore, this allows a reproduction apparatus for reproducing a plurality of loaded discs to be provided with improved function and performance such as high-speed display of text data, or display and reproduction control during replacement of the recording discs.

Incidentally, as described in the foregoing, the text data needs not necessarily to be character text but may be digital data such as image data or audio data.

In addition, the application of the present invention is not limited to the CD-text discs. The present invention can also be applied to the DVD discs on which sub-data associated with main data is recorded. For example, for the DVD video discs, it is possible to use sub-data such as audio and sub-picture data or a VOBS (video object set) recorded following a VTSI (Video Title Set Information) or a VMGI (Volume Manager Information), which is navigation data (PGCI or Program Chain Control Information) in a VGM s (Volume Manager) or a VTS (Video Title set). In other words, a part of the aforementioned sub-data is read and stored before the main data or video data is reproduced, thereby making it possible to determine discs, display the sub-data, or perform reproduction control.

Furthermore, in the aforementioned embodiment, a hard disc (HDD) has been described as an example of a high-capacity high-speed storage device. However, the present invention is not limited thereto and, for example, a semi-conductor memory may be employed.

As is obvious from the foregoing, the present invention can implement a reproduction apparatus which can perform high-speed reproduction control on a recording medium and has an improved functions and performance.

The invention has been described with reference to the preferred embodiments thereof. It should be understood by those skilled in the art that a variety of alterations and modifications may be made from the embodiments described above. It is therefore contemplated that the appended claims encompass all such alterations and modifications.

What is claimed is:

1. A reproduction apparatus for use with a recording medium on which sub-data is recorded in association with main data, comprising:
   a reading device for reading said sub-data from said recording medium,
   a memory for storing said sub-data,
   a data discriminator for determining whether a piece of sub-data read from said recording medium, which is at least one portion of said sub-data, is included in stored sub-data already stored in said memory, and
   a controller for stopping said reading device from reading said sub-data when said data discriminator determines that said piece of sub-data is included in the stored sub-data.

2. A reproduction apparatus according to claim 1, wherein said controller controls so as to perform reproduction of said recording medium in accordance with the stored sub-data when said data discriminator determines that said piece of sub-data is included in the stored sub-data.

3. A reproduction apparatus according to claim 1, wherein said piece of sub-data has a predetermined bit length.

4. A reproduction apparatus according to claim 1, further comprising a recording medium discriminator for discriminating whether said sub-data is recorded on said recording medium.

5. A reproduction apparatus according to claim 1, wherein said controller executes control to read said sub-data from said recording medium and to store the read sub-data in said memory when said piece of sub-data is not included in the stored sub-data.

6. A reproduction apparatus according to claim 5, wherein control data is recorded in association with said main data on said recording medium and said controller executes control to store read control data read from said recording medium in association with said sub-data in said memory.

7. A reproduction apparatus according to claim 1, wherein said memory includes a hard disc apparatus.

8. A method of reproducing a recording medium on which sub-data is recorded in association with main data, comprising the steps of:

reading said sub-data from said recording medium, storing said sub-data, determining whether a piece of sub-data read from said recording medium, which is at least one portion of said sub-data, is included in the stored sub-data, and stopping reading said sub-data when said piece of sub-data is included in the stored sub-data.

9. A method according to claim 8, wherein reproduction of said recording medium is performed in accordance with the stored data when said piece of sub-data is included in the stored sub-data.

10. A method according to claim 8, wherein said piece of sub-data has a predetermined bit length.

11. A method according to claim 8, further comprising the step of discriminating, prior to reading of said piece of sub-data, whether said sub-data is recorded on said recording medium.

12. A method according to claim 8, wherein the steps of reading said sub-data from said recording medium and storing the read sub-data are executed when it is determined that said piece of sub-data is not included in the stored sub-data.

13. A method according to claim 12, wherein control data is recorded in association with said main data on said recording medium and comprises the step of storing read control data read from said recording medium in association with said sub-data.

14. A method according to claim 8, further comprising the step of providing a hard disc apparatus for storing said sub-data.

* * * * *